（12） United States Patent
Cuende Alonso

(10) Patent No.: US 8,468,581 B2
(45) Date of Patent: Jun. 18, 2013

(54) METHOD AND SYSTEM FOR THE CONFIDENTIAL RECORDING, MANAGEMENT AND DISTRIBUTION OF MEETINGS BY MEANS OF MULTIPLE ELECTRONIC DEVICES WITH REMOTE STORAGE

(75) Inventor: Daniel Cuende Alonso, Las Rozas (ES)

(73) Assignee: Savemeeting, S.L., Madrid (ES)

(*) Notice: Subject to any disclaimer, the term of this patent is extended or adjusted under 35 U.S.C. 154(b) by 576 days.

(21) Appl. No.: 12/725,454

(22) Filed: Mar. 17, 2010

(65) Prior Publication Data

US 2010/0241845 A1 Sep. 23, 2010

Related U.S. Application Data

(60) Provisional application No. 61/161,339, filed on Mar. 18, 2009.

(51) Int. Cl.
*H04L 29/06* (2006.01)

(52) U.S. Cl.
USPC .............. 726/4; 726/27; 709/204; 705/7.13; 705/7.19

(58) Field of Classification Search
USPC ........................................................ 726/4
See application file for complete search history.

(56) References Cited

U.S. PATENT DOCUMENTS

| 5,146,439 | A | 9/1992 | Jachmann et al. |
| 2003/0103075 | A1* | 6/2003 | Rosselot ................. 345/717 |
| 2003/0188161 | A1* | 10/2003 | Ndiaye .................... 713/168 |
| 2008/0071861 | A1* | 3/2008 | Ingalls et al. ............ 709/204 |
| 2008/0082557 | A1 | 4/2008 | Ohara et al. |
| 2008/0195704 | A1* | 8/2008 | Salesky et al. ........... 709/204 |
| 2008/0263010 | A1* | 10/2008 | Roychoudhuri et al. ...... 707/3 |
| 2009/0044251 | A1* | 2/2009 | Otake et al. ................ 726/3 |
| 2009/0119246 | A1* | 5/2009 | Kansal ........................ 707/2 |
| 2009/0234704 | A1* | 9/2009 | Roher et al. ............... 705/9 |
| 2009/0248474 | A1* | 10/2009 | Fried et al. ................ 705/8 |

OTHER PUBLICATIONS

Yu et al., "Smart Meeting Systems: A Survey of State-od-the-Art and Open Issues", Feb. 2010, ACM Computng Surveys, pp. 8:1-8:20.*

* cited by examiner

*Primary Examiner* — Taghi Arani
*Assistant Examiner* — Thaddeus Plecha
(74) *Attorney, Agent, or Firm* — Klauber & Jackson LLC

(57) ABSTRACT

A specific method is provided for recording, management and confidential distribution of meetings by means of multiple electronic devices, fitted with at least one microphone, mainly a mobile phone, an electronic agenda, or laptop. The method includes recording the meeting, sending this recorded data to the remote server, audio track synchronization, selecting optimum track sections to produce an optimum final track, store this ciphered, coded track in the database, and, finally, publish this track in a confidential manner.

14 Claims, 13 Drawing Sheets

METHOD AND SYSTEM FOR THE CONFIDENTIAL RECORDING, MANAGEMENT AND DISTRIBUTION OF MEETINGS BY MEANS OF MULTIPLE ELECTRONIC DEVICES WITH REMOTE STORAGE

CROSS REFERENCE TO RELATED APPLICATION

The present application claims the priority of provisional application U.S. Ser. No. 61/161,339, filed on Mar. 18, 2009, and the disclosure of such application is incorporated by reference herein in its entirety. Applicant claims the benefits of such application under 35 U.S.C. §119(e).

FIELD OF THE INVENTION

This invention is generally related to meeting management and, in particular, to a method, system and product for the confidential management and distribution of meetings using electronic devices with remote storage.

BACKGROUND OF THE INVENTION

In most meetings, both big and small, with customers, suppliers, internal, training, between private persons and neighborhood communities etc, there are no minutes or common notes. Consequently, there are often subsequent conflicts or poor interpretations and even when there are minutes, these can be the subjective views of the person who wrote them. The most neutral and objective method is to record everything that is said at the meeting. There are existing recording mechanisms that at used at certain meetings, but these are usually expensive and not very operational. Moreover, the meeting protocol and management are normally the responsibility of just one person with secretary functions that consume time in operations that are usually repetitive and of little value.

There is currently a great deal of development in the state of the art to permit tele-conferencing employing the new technologies, the Internet and Webcams etc, but the objective here, is to facilitate tele-presence and avoid the need to travel. There are also patents in the technical field, such as "Method and system for managing a meeting" (US2007/0033091), which describe a method for managing the attendance of participants at a meeting, as well as the matters to be dealt with, but which do not manage the information involved or record the content.

Another problem deriving from recording a meeting when there are several recorders that record what is said, is the audio mixing. Automatic processes are currently in use for such mixing, but not all take into account that the audio mixing is in real time in local mode, in other words, that they are processed at the same time and locally in order to perform the mixing. This involves the use of specific devices and technology, such as an audio mixer table, a computer with various audio inputs for simultaneous signal processing etc. If, in addition, they are simple devices, such as mobile telephones or an electronic agenda, with single audio and communications channels which, because of the data communications characteristics over the network, these are sent in the form of packets, it means that the audio reception of the various sources does not occur in synchronization with the required precision level. For example, in HTTP communications, which is based on packet routing, involves communication delays. This effect increases with packet size and channel saturation. If the calculation time in information encrypting is considered, which depends on the calculation capability of each device, means that transmission can vary from one device to another or their connection type varies if it is a modem or 3G. If the data pass over a network non-measurable delays take place that are not uniform for the devices. Nor is it possible to use the start of recording because the devices are not al switched on at the same time and some may even switched some time during the actual meeting. It should be understood that even the slightest phase mismatch can be quite noticeable to the listener.

SUMMARY OF THE INVENTION

A specific method is provided for the confidential recording, management and distribution of meetings by means of multiple electronic devices, fitted with at least one microphone, mainly a mobile telephone, an electronic agenda, or laptop. The method includes recording the meeting, sending this recorded data to the remote server, audio track synchronization, selection of optimum track sections to produce an optimum final track, store this ciphered, coded track in the database, and, finally, publish this track in a confidential manner.

BRIEF DESCRIPTION OF THE DRAWINGS

The above summary and the following full description of the invention are more understandable when read in conjunction with the attached drawings. In order to illustrate the invention, the drawings show construction examples of the invention; however, the invention is not limited to the specific described methods and systems. In the drawings.

DETAILED DESCRIPTION OF THE INVENTION

This invention covers the needs to confidentially record, manage and distribute meetings by recording them using electronic devices fitted with at least one audio capture device and one reproduction device, such as a microphone and loudspeaker, respectively, signal processing means, storage means and connection means in order to store said meetings on a remote server that performs subsequent meeting management and distribution. Among the preferred electronic devices for use in this invention are mobile telephones, telephones, electronic agendas or PDAs and laptops, but without the invention being limited to these elements. Mobile telephones and telephones have the advantage of allowing recording a real-time meeting over the voice line.

Figure 1:
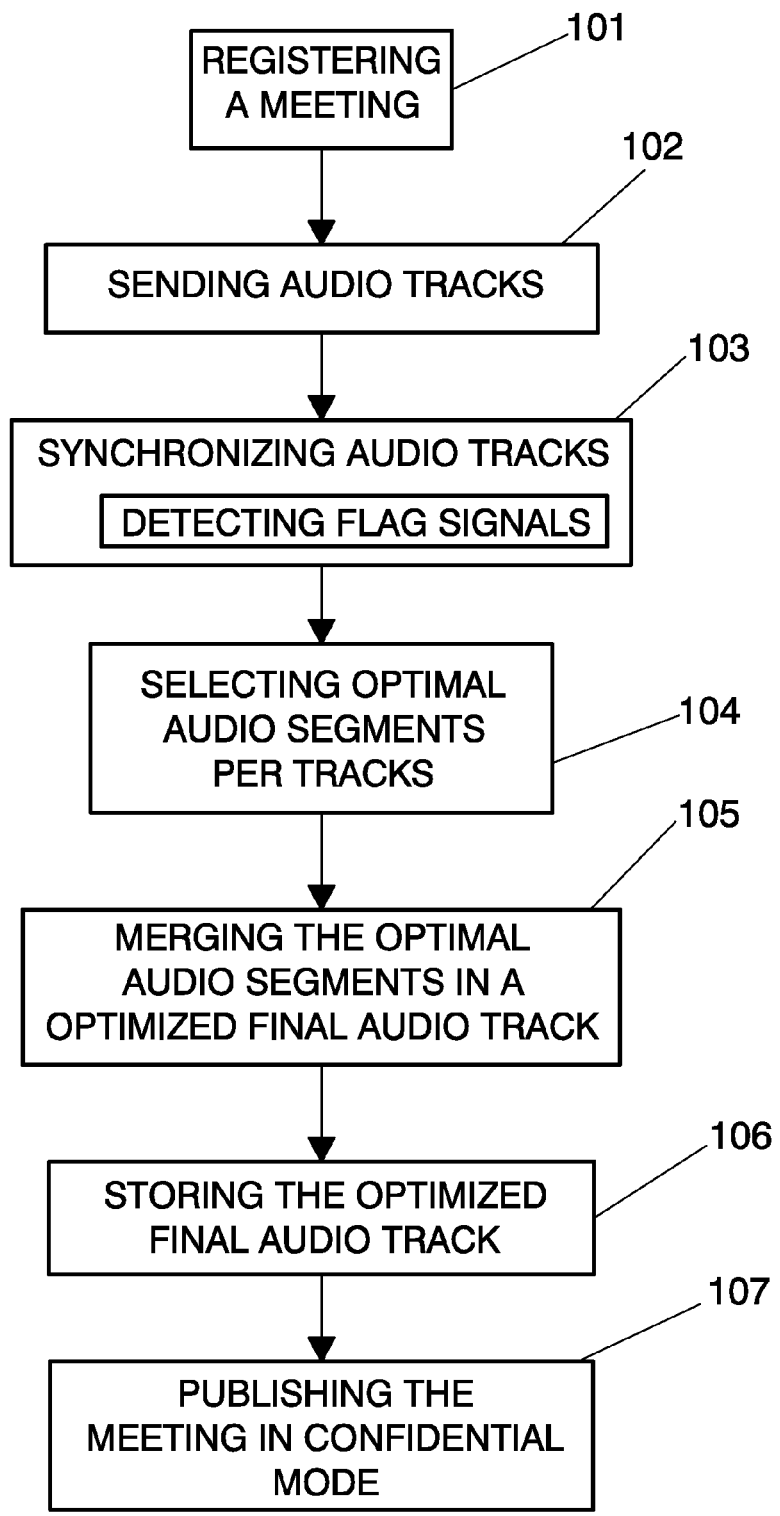
FIG. 1 shows the flow diagram for the confidential meeting recording, management and distribution method using multiple electronic devices with connection to a remote server in accordance with an embodiment of the invention.

FIG. 1 shows the flow diagram for the confidential meeting recording, management and distribution method using multiple electronic devices in accordance with an embodiment of the invention. Step 101 includes recording a meeting by means of at least one electronic device, with this invention being especially useful for two or more devices. The electronic devices comprise at least the following means: audio acquisition means and, optionally, for video, audio signal transmission means, audio signal processing means and, optionally, for video; storage means, and- data exchange means with at least one external electronic device. Step 102 includes sending the audio and, optionally, the video to the remote server. Said tracks are sent by all the associated devices at the meeting. This transmission takes place online if the device-server connection is available and offline if no connection is available during the meeting. Step 103 includes synchronizing the audio tracks by detecting the flag signals included during meeting recording and inserted by the signal processing means, being the flag signals of the type of audible flag signals or silent flag signal. Optionally, a warning alert can be emitted with a predefined period of time to alert that the meeting is being recorded. Step 104 includes selecting optimum audio sections per audio track from among all the tracks received by the server. Said tracks come from the electronic devices associated with the meeting. Step 105 includes mixing the optimum sections per track in order to obtain a final optimum audio track which, in turn, is mixed with a video track, if one is available. Step 106 includes storing the final ciphered and coded optimum tack in a database. Step 107 includes confidential publication of the final optimum audio-video track, with prior authorization. With said final optimum audio-video track being accessible from any device connected to the server on which the final optimum audio-video track is stored.

Figure 2:
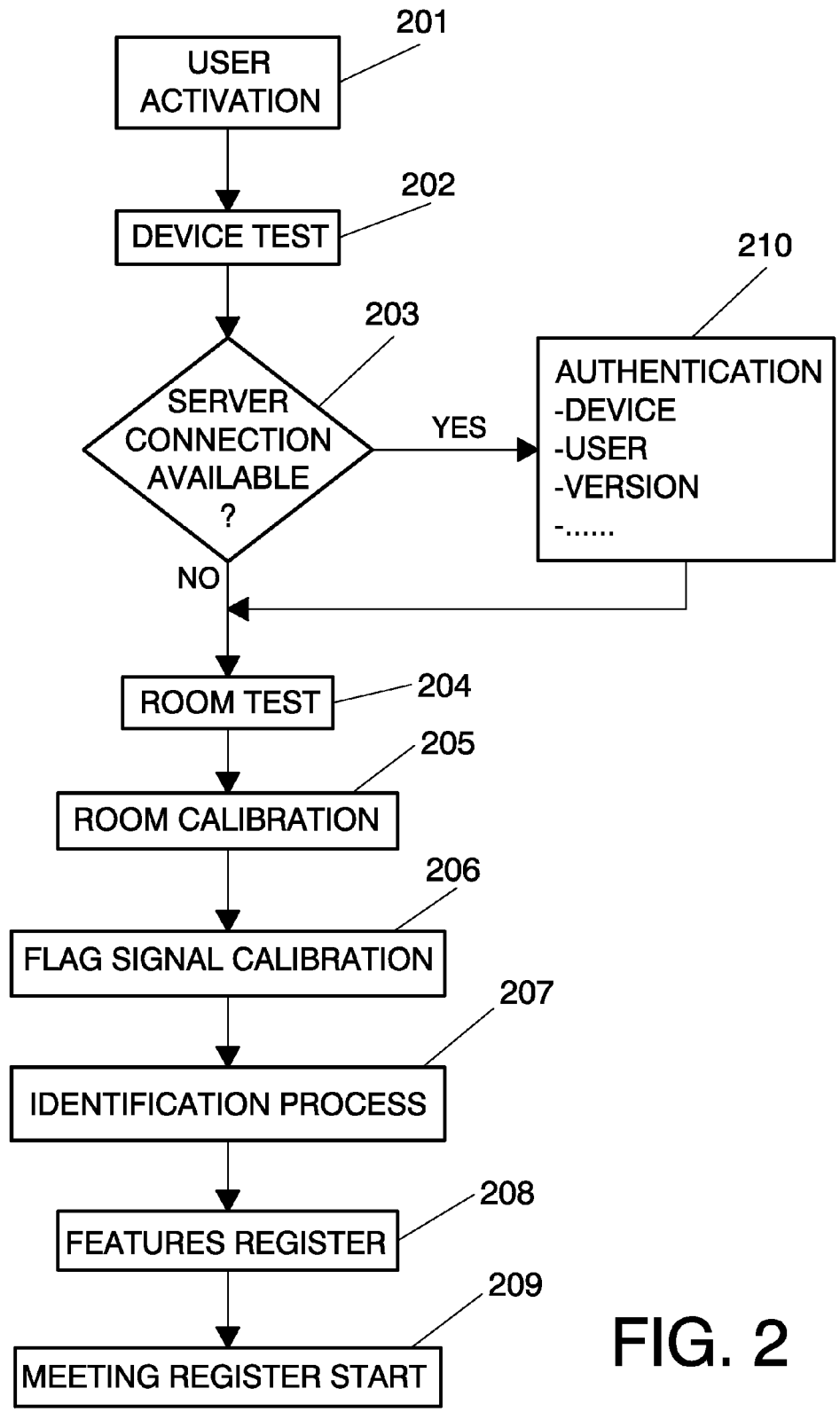
FIG. 2 shows the flow diagram for the confidential meeting recording, management and distribution method in the electronic devices in accordance with an embodiment of the invention.

FIG. 2 shows the flow diagram for the confidential meeting recording, management and distribution method in the multiple electronic devices in accordance with an embodiment of the invention. Step 201 includes activating the method in the electronic device via a user password. Step 202 includes executing an electronic device test to evaluate the hardware resources of the device, namely, the CPU, RAM, CPU clock speed, available hard disk space, recording speed, encryption test computation speed, microphone and its audio specifications of frequency and gain etc. number of inputs, type, directional, environment, stereo; loudspeakers (maximum volume, distortion and power etc), video (resolution, focus, white balance, refresh speed etc), communications network connection (physical communications type: telephone line, modem, Ethernet, USB, wireless, GRPS, 3G), communications protocol (FTP, HTTP, WAP etc.), connection port test with the server, average upload and download speeds with the remote server, environment (local network, Intranet, Internet, direct connection), additional characteristics (GPS, finger print reader, USB connection, hands-free loudspeakers, environmental microphone, infrared sensor and Bluetooth etc.). Additionally, step 202 consists of evaluating whether the electronic device meets the minimum requirements for performing the functions of recording, notifying the user of the type of meeting that can be recorded and the maximum estimated recording time with and without server communications. Step 203 includes verifying whether server connection is available to authenticate user devices, the users, the types of privileges associated with the meeting attendees and their versions etc. Step 204 includes performing the room test to determine the best locations for the input devices for optimum audio and video recording, if the latter is available. In a first stage of this step, optimum redefined positions are shown that can be adapted to the meeting location and expanded by photos for enhanced use by the user. Said drawings are produced by the actual method and can also be expanded by the user. The approximate positions where the devices should be located, together with the participants that wish to make recordings are shown on the drawings. The option to describe the meeting location is made via a Web or local interface in the device, together with a wizard. Said wizard includes parameters for introducing the user, as well as the description of the environment, noise, sound sources, background music, together with physical room aspects, such as size, shape, height, table, table shape and position etc. The second stage in this step includes the evaluation of voice levels to determine whether the minimum quality level for correct recording of the participants is met or not. Step 205 includes calibrating the room by measurement with at least two devices so that, in a coordinated fashion, they are converted into transmitters and receivers of an audio intensity and tone signal standard. An electronic device emits an audio signal varying in intensity and tone. The other devices receive and measure this signal, process it and compare it with the standards stored in their memories. It is then sent to the server. Thus, the server is able to determine the audio signal quality received by each electronic device and analyze the predetermined positions of step 204, recommending any necessary new positions. It will also determine the main and secondary electronic devices, with the main one being the device with the best signal/noise ratio within the devices audible by the other devices. Said step 205 also allows the room conditions, such as ambient noise, background music and wind etc to be re-evaluated. This test will also permit a periodic automatic self-adjustment to be made during the meeting to evaluate whether there are any new conditions, for example, ambient noise variations, or if participants have moved. The second stage of step 205 includes re-evaluating attendee voice recording, in case changes in their positions have been detected. When all devices have been distributed, one of the electronic devices will request the participants, one-by-one, to say a few predetermined words in order to measure the signal and its reception quality. Once again, this will allow further processing and recommendations for moving one or more electronic devices in order to guarantee correct recording. Step 206 includes calibrating the flag signal to permit automatic audio track synchronization at the remote server for the various devices. The synchronization can be carried out with a real-time provider or by means of a merging algorithm that analyzes the wave. Using certain initial parameters, such as signal type, frequency, period, volume, coding, retransmission periodicity etc, downloaded from the server, one of the devices that is guaranteed to be heard by all other devices, will emit a coded signal, audible or not, containing information, such as a sequence number, the time or duration, which will be recorded by the other electronic devices on their audio tracks. Step 207 includes executing the participant identification processes and the meeting location by participant biometric parameters, such as voice or fingerprint etc, together with position location parameters, such as GPS, mobile telephone network cell, telephone signal triangulation, originating telephone, network connection data (IP, WiFi area, access provider and domain etc.). Step 208 includes registering all the characteristics described in steps 204 to 207 on the server for each device associated with the same meeting, with online connection. Step 209 includes sending messages confirming the start of the metering to all devices associated with said meeting.

Figure 3:
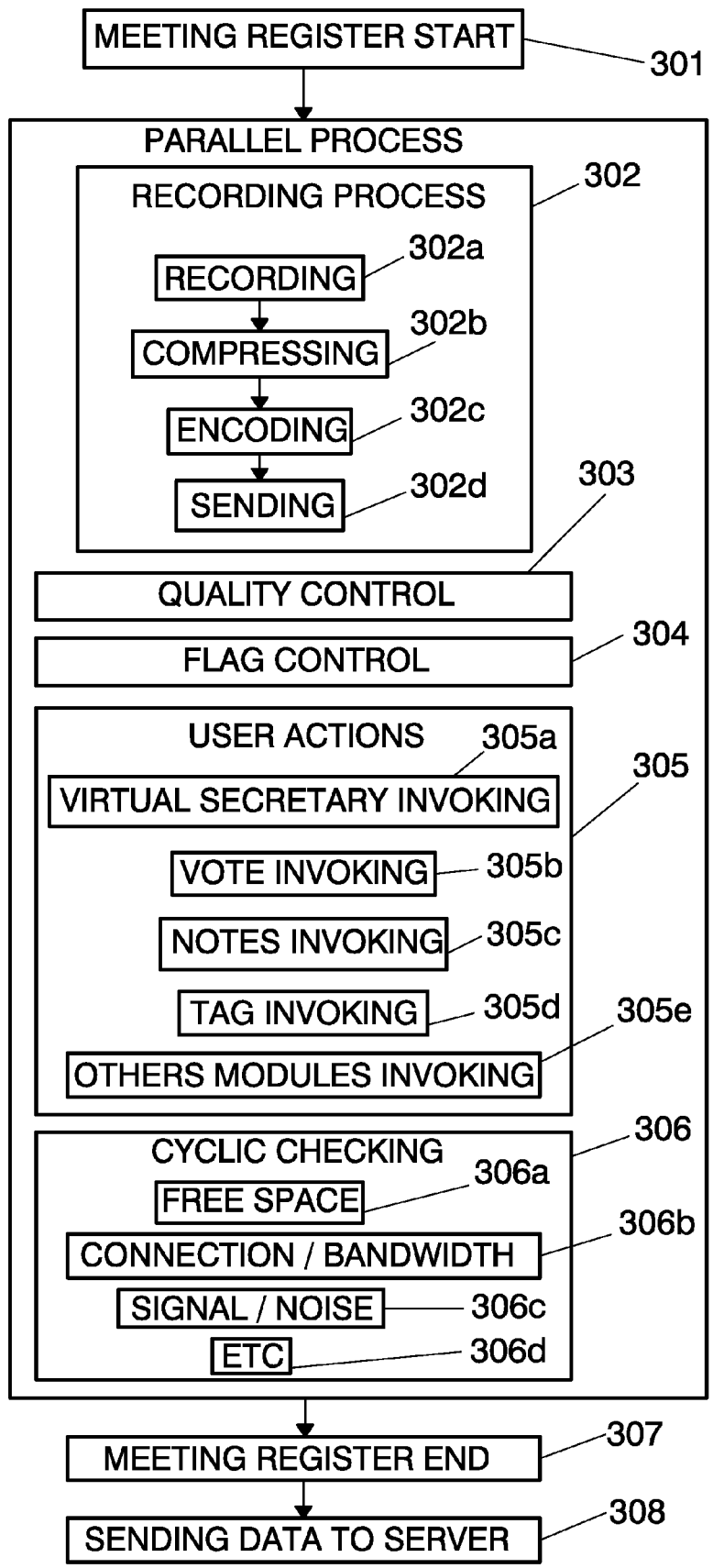
FIG. 3 shows the flow diagram for the confidential meeting recording, management and distribution method in the electronic devices in accordance with an embodiment of the invention.

FIG. 3 shows the flow diagram for the confidential meeting recording, management and distribution method in the multiple electronic devices in accordance with an embodiment of the invention. Step 301 includes the initiation of recording the meeting for which the parallel processes of steps 302 to 306 are activated. Step 302 includes sequentially carrying out steps 302*a* to 302*d*. Step 302*a* includes determining the meeting recording manner and type, together with its recording. Step 302*b* includes determining the best audio and video compression algorithm, taking into account whether this election is to be performed manually or automatically and the application of the same to the previously obtained recording. Step 302*c* includes encrypting the meeting recording by double layer encryption techniques by first applying the asymmetric public/private key followed by the symmetric algorithm. Among asymmetric algorithms are the RSA and DSA etc and DES and AES among the symmetric. Step 302*d* includes sending the compressed and encrypted recording to the remote server. Step 303 includes quality assurance for the recording from each electronic device. Step 304 includes monitoring the transmission of the flag signal for each pre-established time period. Step 305 includes performing the user actions determined in steps 305*a* to 305*e*. Step 305*a* includes calling the Virtual Secretary, which includes activating and processing specific events by means of commands, such as "send", "copy", "notification", "delete", "meeting", "video", "summary", "voting", "end", "pause", "generate notifications", "inviteparticipant", "new meeting", "close voting", "enumerate participants", "identify", "certify position", "identify participant", "present results", "meeting description", "reason", "objective" and "annotation". It also incorporates predefined time concepts, such as: "now", "tomorrow", "a week", "a month", "before/after the meeting". Step 305*b* includes calling for voting. Voting management requires a series of initial parameters that are entered by the users or certain default values established as a template associated with the user, the company, the meeting type, subject timetable and location etc. This information is held in the server local database. The main voting process parameters are:

Time: immediate, delayed;
Vote: anonymous, confidential, public;
Value: weighted vote, simple vote, by points, by options;
Query mode: closed fields, open fields, scale;
Method: E-mail, SMS, telephone call to a number, Web, manual (voice, show of hands etc with subsequent recording option), specific application in mobile device;
Voters: participating at the meeting, not participating at the meeting;
Definitions: quorum, evaluation method, majority (simple, absolute etc), number of rounds, consultation rounds, selection criteria per round, response times, number of reminders, results access format, presentation mode, distribution.

The voting process comprises the following steps:
1. Parameter generation:
   a. Reading previous parameters,
   b. Creation of new parameters,
   c. Template usage;
2. Questionnaire generation by the person responsible, with the questions and response options.
3. Sending the query and attached data for voting.
4. Control of time for sending notifications and voting reminders via E-mail and telephone call etc.
5. Vote reception by the various channels.
6. Voting closure.
7. Results coding and calculation.
8. Results presentation and distribution according to defined parameters:
   a. Certification generation,
   b. Statistics,
   c. Results;
9. Annotations.
10. Impugnation.
11. Associated actions.
12. Storage of results and data sets associated with the meeting.

Automatic voting process management provides high added value to the system because it facilitates and lightens the human resource load and, at the same time, provides the event with rigour and constancy. Step 305*c* includes calling the Annotations. By means of predefined voice commands, each device user is able to add personal comments on the meeting as added useful information once the time has expired. Step 305*d* includes calling for labeling. The participants can use this step to label the various parts into which they want the meeting to be divided, for example, presentation, introduction, main matters to be dealt with, voting and conclusion etc. Step 305*e* includes calling other modules or applications, such as the presentation and agenda plug-ins, analogue meeting coding etc. Step 306 includes carrying out a series of periodic verifications every previously defined time interval. Said verification set includes performing steps 306*a* to 306*d*. Step 306*a* checks the space available on each electronic device for storing the recording. Step 306*b* checks the connection between the electronic device and the remote server, together with the available bandwidth. Step 306*c* verifies the ambient conditions in the room, for example, noise. Step 307 includes sending a completion signal to the server by each device associated with said meeting. Lastly, step 308 includes the transmission of pending data to the server.

Figure 4:
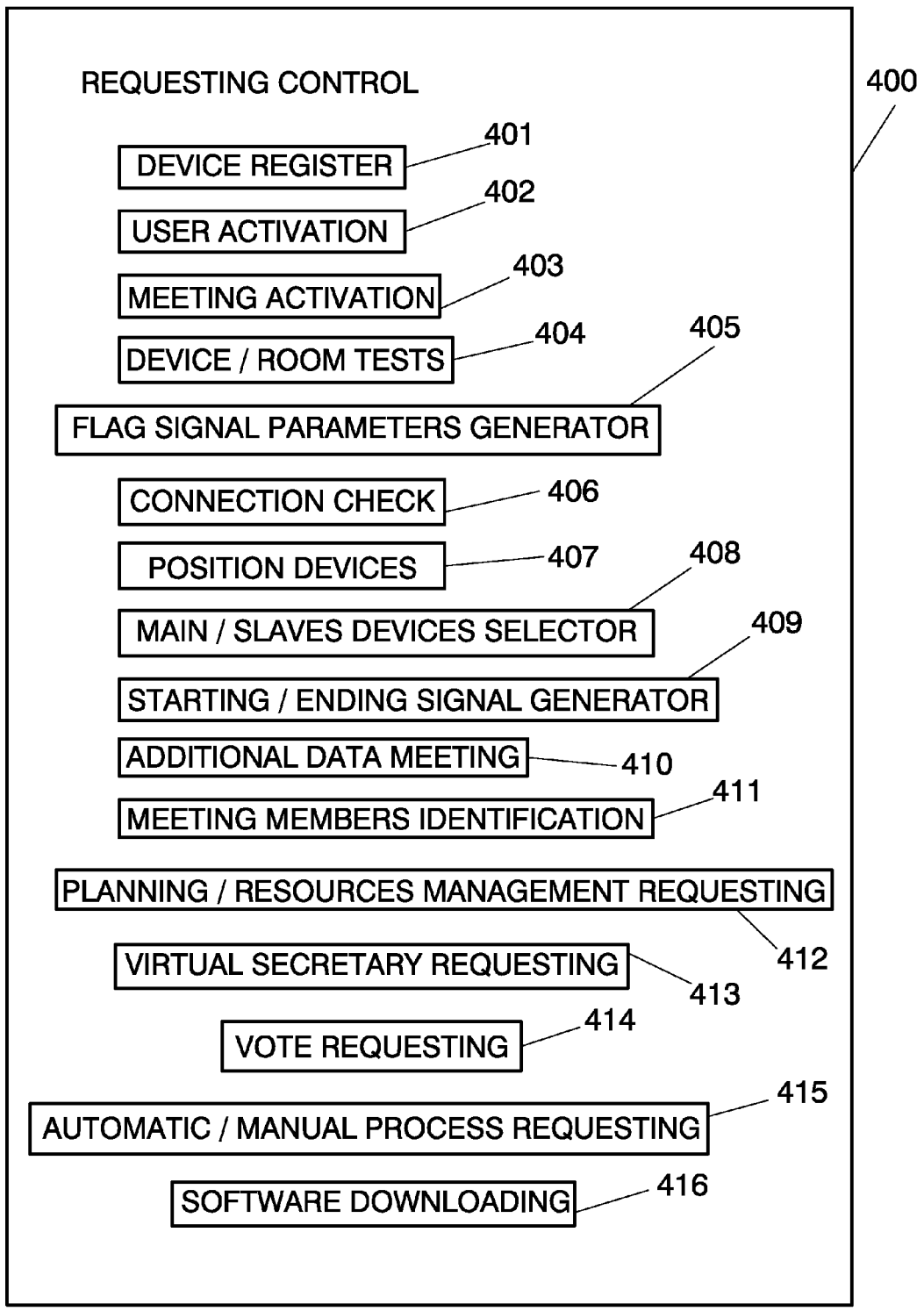
FIG. 4 shows the block diagram for the confidential meeting recording, management and distribution system on the server in accordance with an embodiment of the invention.
Figure 5:
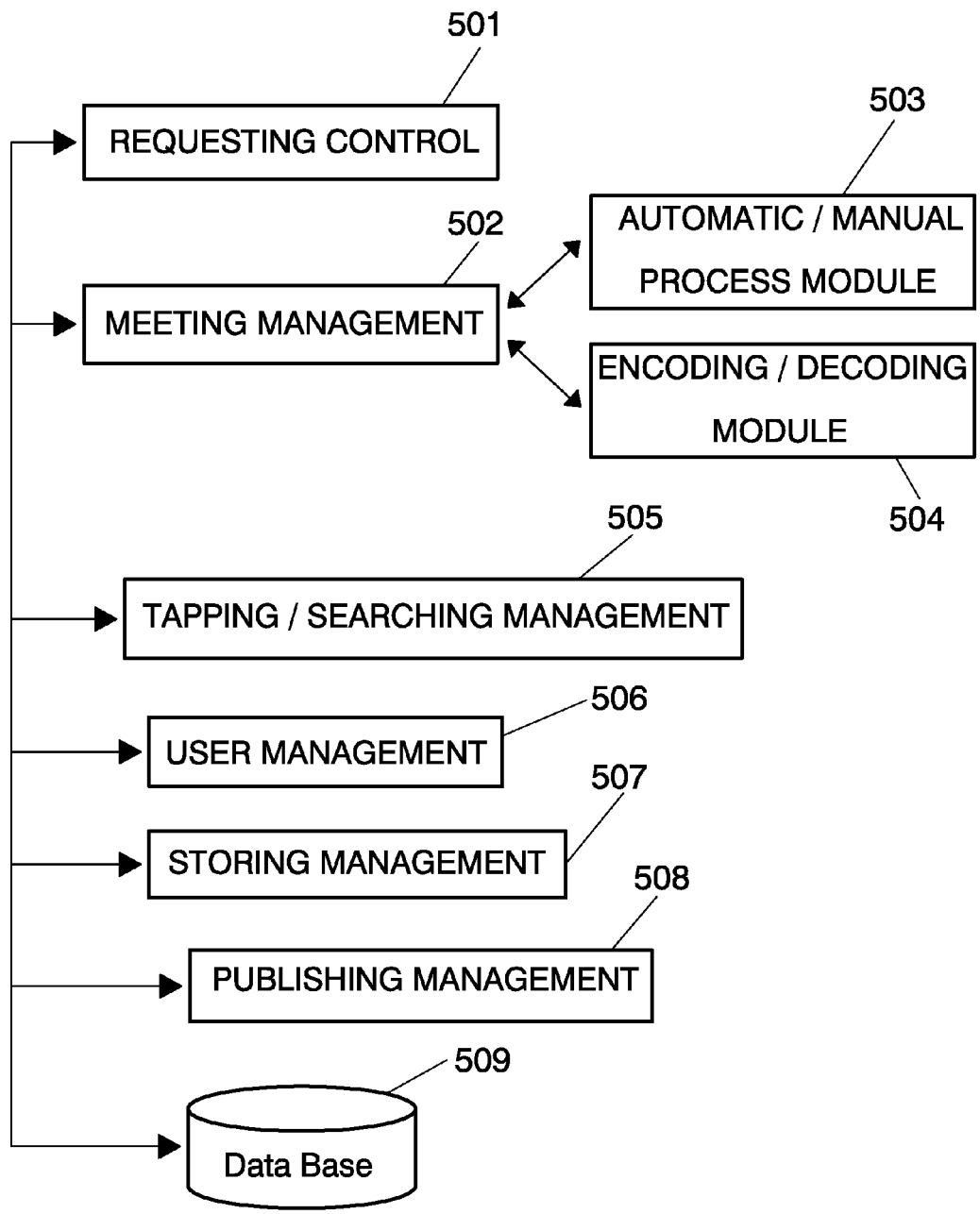
FIG. 5 shows the flow diagram for the confidential meeting recording, management and distribution system in the electronic devices in accordance with an embodiment of the invention.

FIG. 4 shows the block diagram for the confidential meeting recording, management and distribution method on the server in accordance with an embodiment of the invention. The system includes the petition control module 400 that comprises modules 401 to 416, which process petitions form the electronic devices associated with the meeting. Module 401 processes the recordings of the electronic devices. Module 402 processes user password validation. Module 403 processes meeting registration. Module 404 processes the results of the device and room tests. Module 405 generates the flag signal parameters. Module 406 verifies the server connection with each device associated with the meeting. Module 407 processes the sending of the electronic device positions. Module 408 determines the main and secondary electronic devices. Module 409 processes the transmission of the meeting start and end. Module 410 processes additional meeting data. Module 411 processes the identity of the meeting participants. Module 412 process petitions to the Planning and Resource Manager. Module 413 processes virtual secretary petitions. Module 414 processes voting petitions. Module 415 processes automatic and manual process petitions. Module 416 processes software downloading FIG. 5 shows the block diagram for the confidential meeting recording, management and distribution system on the server in accordance with an embodiment of the invention. Module 501 controls the petitions from the electronic devices and activates the various system modules. Module 502 is the meeting management module, which is interconnected with the automatic and manual processes module 503, the Encryption/Decryption module 504, Operation/Query Management module 505, the User Management module 506, the Storage Management module 507, the Publication Management module 508 and Database module 509.

Figure 6:
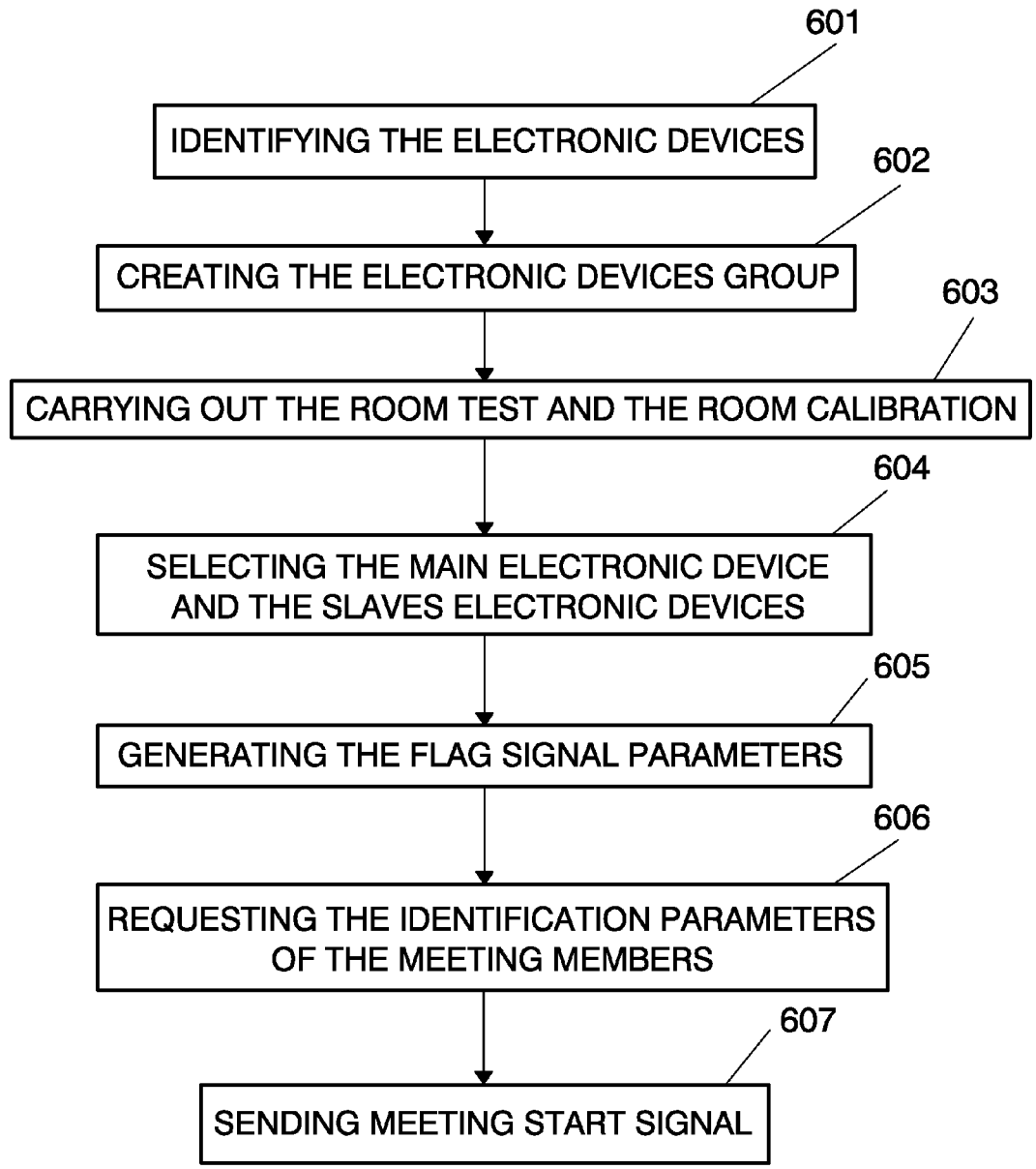
FIG. 6 shows the flow diagram for the confidential meeting recording, management and distribution method in the Meeting Management module installed on the server in accordance with an embodiment of the invention.

FIG. 6 shows the flow diagram for the confidential meeting recording, management and distribution method in the Meeting Management module installed on the server in accordance with an embodiment of the invention. The method includes the carrying out of step 601 by the Meeting Manager in the server, which includes processing the information from each electronic device connected to the server, with this information being the result the device 202 test. Step 602 includes creating a device group that consists of all devices identified within the same meeting. Step 603 includes the evaluation, together with the devices in the device group, of the optimum positions of said devices, for which reason the Meeting Manager sends the optimum positions via the device interface. In addition, this step includes information in the form of parameters entered by the user as the description of the environment, noise, sound sources, background music and also physical aspects of the room: size, shape, height, table: table shape, together with attendee position and identify. Similarly, this step includes recording the participant noise level and measuring its quality factor by the signal/noise ratio and recommending new positions for the meeting participants if necessary. Additionally, step 603 performs room calibration, for which various signals are produced, changing their parameters so that at least two devices become transmitter and receiver of said signals in a coordinated fashion.

The server sends a signal to one electronic device, which said device then retransmits varying the intensity and tone. The other devices receive the signal, process it and compare it with the template held in their memories and send it to the server. In this way, the server determines the quality of the received audio signal and analyses the device positions and recommends any necessary new positions. Step 604 includes determining the main and secondary electronic devices for which the previous step is carried out for all the devices to find the device with the best signal/noise ratio that is heard by all the rest. Said device becomes the main device and the rest are secondary devices. Step 605 includes generating and sending the flag signal parameters to the main electronic device so that it can transmit a flag signal to the other, secondary. The flag signal parameters are signal type, frequency, period, volume, coding, retransmission periodicity etc, together with additional information, such as sequence number, time and duration, with said information being recorded in each device. Step 606 includes identifying the participants by biometric parameters, to which other parameters, such as position etc are added. Step 607 includes sending a signal confirming the start of the meeting to all devices associated with this meeting. All steps 601 to 607 include the interconnection of the Meeting Manager with the database for updating and exchanging the information required to perform said steps 601 to 609.

Figure 7:
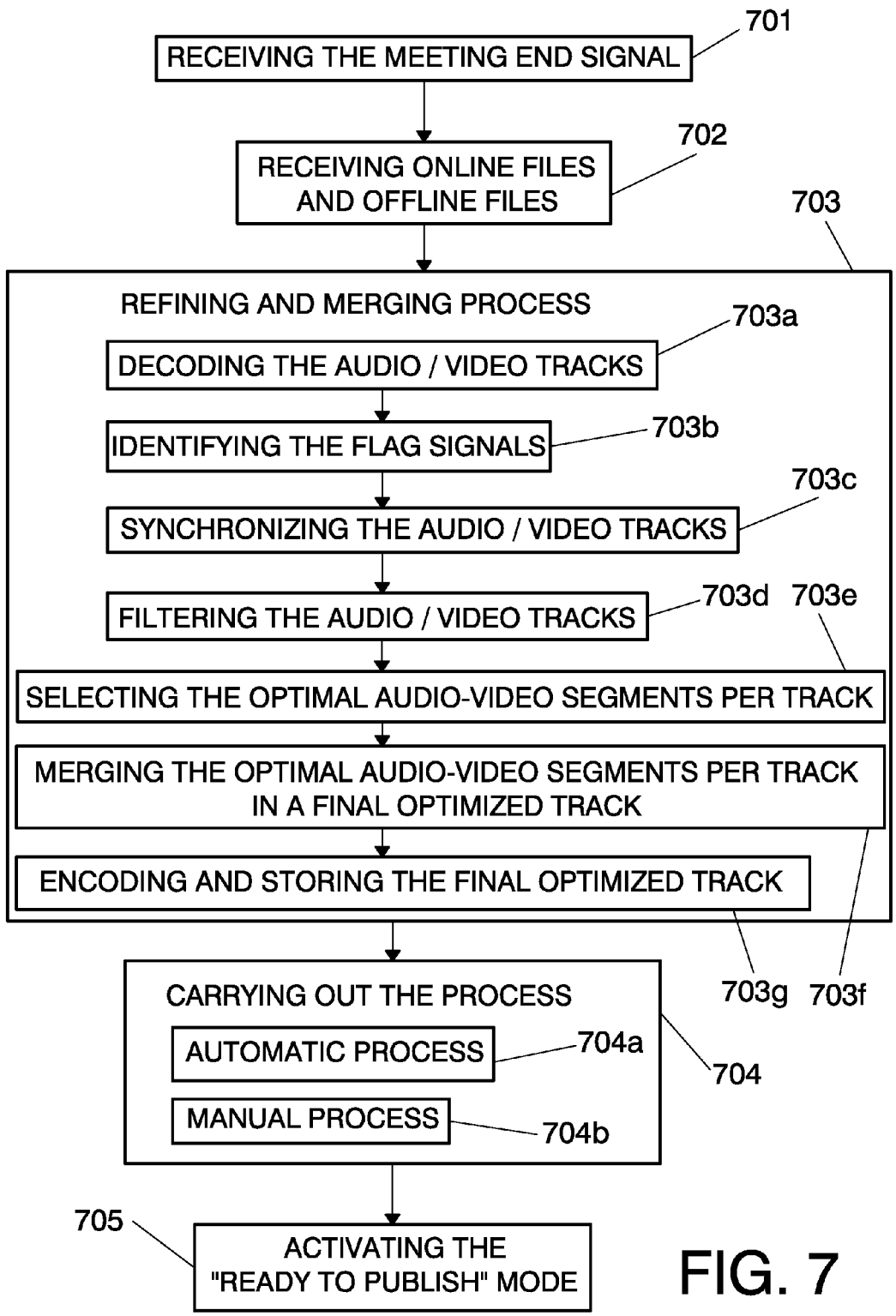
FIG. 7 shows the flow diagram for the confidential meeting recording, management and distribution method on the server when the meeting is over in accordance with an embodiment of the invention.

FIG. 7 shows the flow diagram for the confidential meeting recording, management and distribution method by multiple electronic devices, on the server in accordance with an embodiment of the invention. Step 701 includes receiving confirmation of the end of the meeting from the Meeting Manager, by all devices associated with the same meeting. Step 702 includes receiving the files containing all the information associated with the meeting. Said reception is made online if there is a server connection and offline if there is no server connection when the meeting is concluded. The files are held in a database and managed by the Storage Manager. Step 703 includes the debugging and mixing of the various files associated with each device in order to obtain a final audio and/or video track by means of the following sub-steps. Sub-step 703*a* includes decrypting the audio and video tracks of the latter is available, for which the initial parameters are checked, decrypting the shared key symmetric algorithm and, lastly, decrypting the file using the inverse process of the algorithm selected by the user via password, the asymmetric public/private key and asymmetric process. Sub-step 703*b* includes identifying the flags on each audio and video track if the latter is available. Sub-step 703*c* includes synchronizing all audio-video tracks from the flag identified on each one. Step 703*d* includes filtering the audio-video tracks. Step 703*e* includes selecting the optimum sections per track from each electronic device associated with the meeting. Step 703*f* includes merging all tracks into one, called the final track. Sub-step 703*g* includes coding the final audio-video track and storing it in the database. Step 704 includes executing the automatic processes 704*a* and manual ones 704*b*, with the automatic processes handled by the Meeting Manager without any intervention from the electronic device user and the manual processes are also handled by the Meeting Manager but require a certain amount of intervention by the device user. Among the processes automatically handled by the Meeting Manager, the following are noteworthy: notifications, warnings, generation of minutes, events, track labeling with the parts of the meeting, transmissions, acknowledgements, certificate generation, data distribution, content publication, distribution list management and automatic transcription. Automatic process can be activated from the various points, but this is most commonly performed by calling the virtual secretary, either by voice, by specific application access or derived from a rule or macro. Automatic processes are registered in the database as commands and are associated with the instruction set and the code that has to be executed in its activation. The most significant manual processes are text transcription, text translation, supervision and correction of automatically translated text and of automatically transcribed text, Legal Assessment and budget approval etc. Step 705 includes activating the "Ready to publish" mode for the Publication Management module, which allows confidential access and distribution of the meeting recording, together with all its associated data to authorized users. Steps 701 to 705 are carried out once all the files arrive online at the server, while they are repeated as many times as the number of times that the files arrive at the sever when communications are offline.

Figure 8:
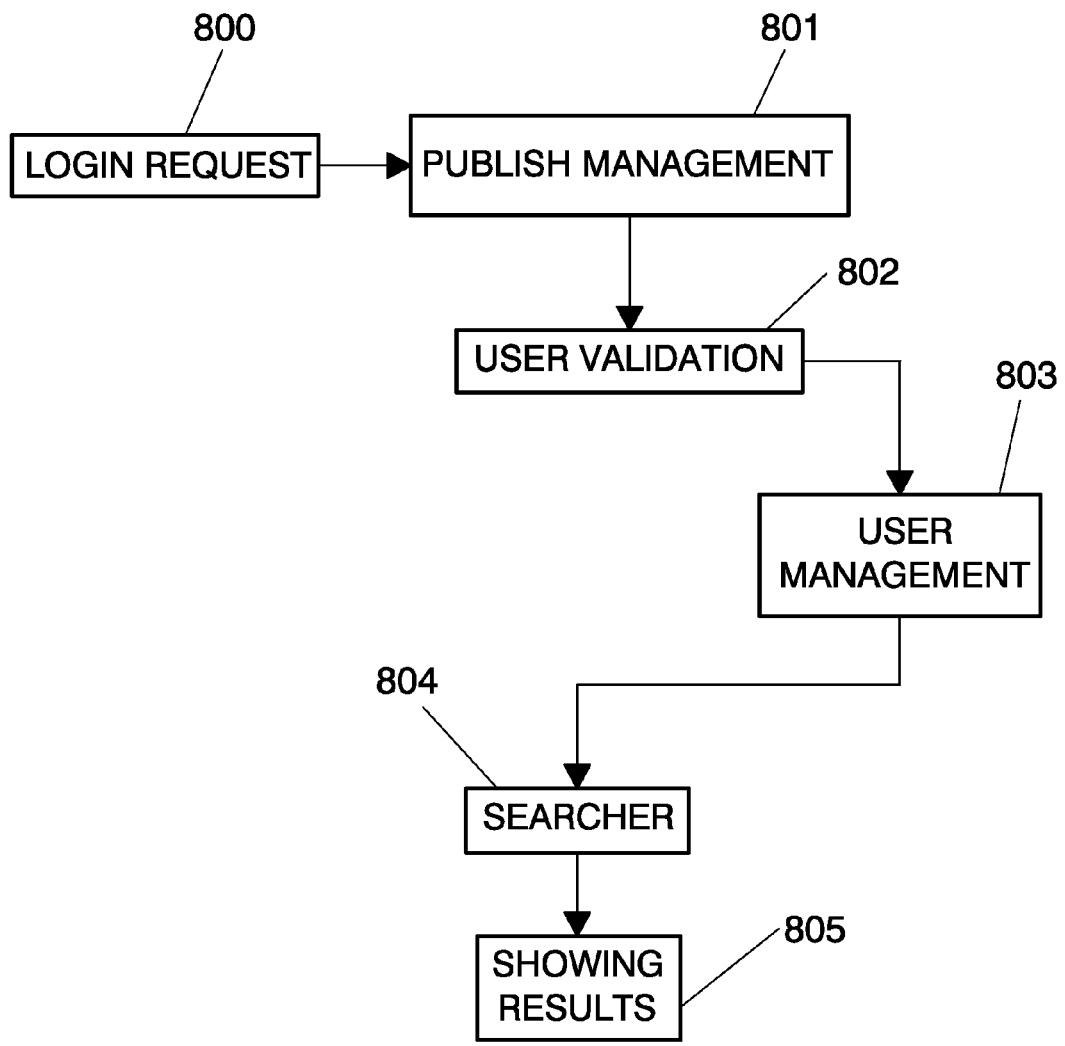
FIG. 8 shows the flow diagram for the confidential meeting recording, management and distribution method on the server when a petition is made to the server attended by the Publication and User Management modules in accordance with an embodiment of the invention.

FIG. 8 shows the flow diagram for the confidential meeting recording, management and distribution method by multiple electronic devices on the server when a petition is made to the server attended by the Publication and User Management modules in accordance with an embodiment of the invention. Step 801 includes receiving a consultation petition or meeting recording access 800 in the Publication Manager. Step 802 includes denying access to an unauthorized user and allowing access to all meeting data to an authorized user. Step 803 includes activating the User Manager to handle user access to the stored information in function of the type of access said users have to the information via step 804, which includes performing a search of the database that holds all the user characteristics, together with distribution lists. The search enables data that the system associates with each meeting as well as any word or word group to be found in the meeting recordings. Step 805 includes presenting the results required by the authorized user.

Figure 9:
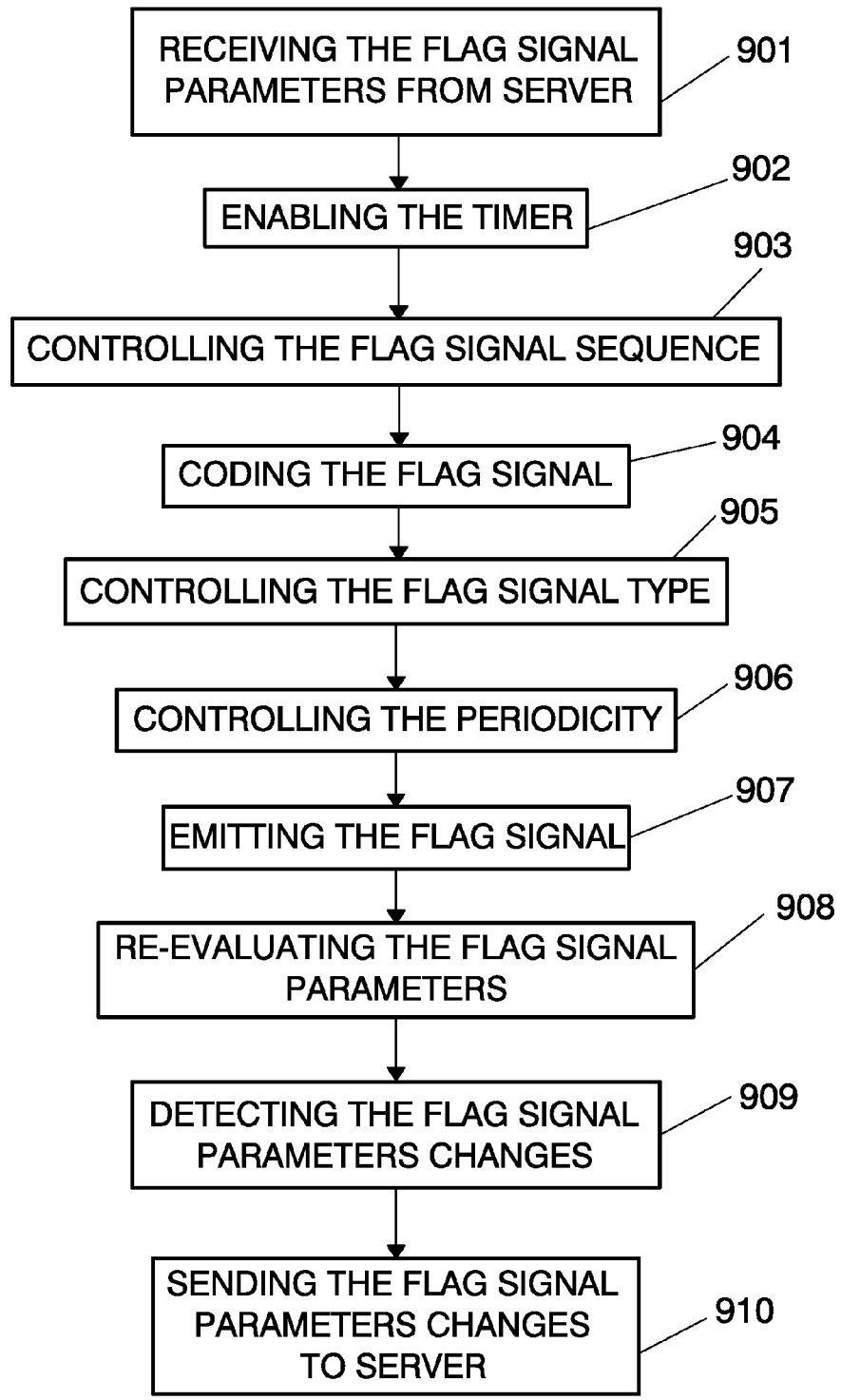
FIG. 9 shows the flow diagram for the flag transmission method in the electronic device in accordance with an embodiment of the invention.

FIG. 9 shows the flow diagram for the flag transmission method in the main electronic device in accordance with an embodiment of the invention. Step 901 includes receiving the flag signal parameters from the server in the main electronic device. Step 902 includes activating the device timer. Step 903 includes controlling the flag signal transmission sequence. Step 904 includes coding the flag signal. Step 905 includes controlling the flag signal type. Step 906 includes establishing the periodicity with which the flag signal is transmitted, together with re-evaluation of the parameters calculated by the main electronic device. Step 907 includes transmitting the flag signal. Step 908 includes re-evaluating the flag signal parameters. Step 909 includes detecting changes in the flag signal. Step 910 includes sending the detected changes to the server.

Figure 10:
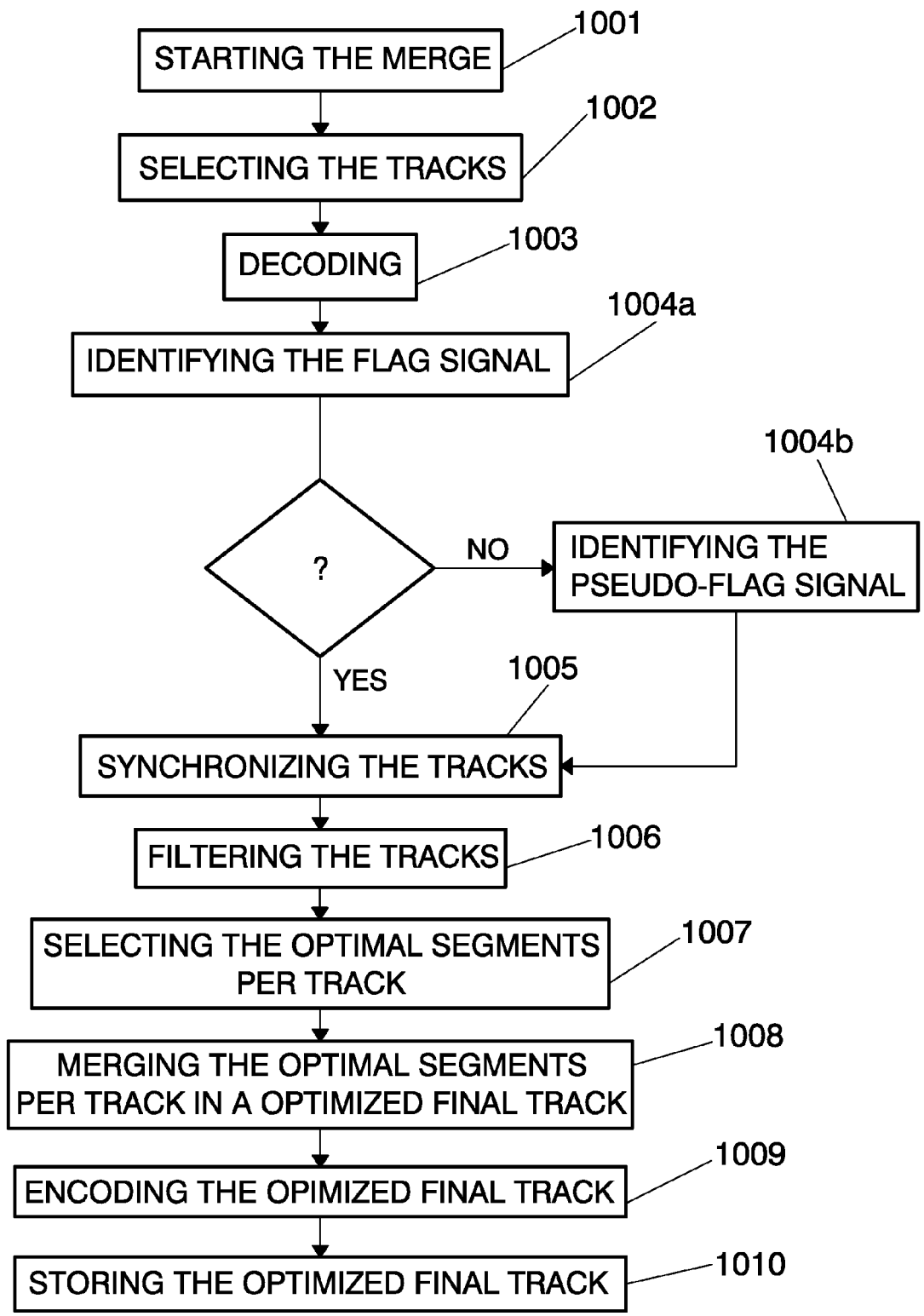
FIG. 10 shows the flow diagram for the mixer method on the sever using the flag signals in accordance with an embodiment of the invention.

FIG. 10 shows the flow diagram for the mixer method on the sever using the flag signals in accordance with an embodiment of the invention. Step 1001 includes initiating the mixing process. Step 1002 includes selecting the audio-video tracks, stored in the database, corresponding to this same meeting. Step 1003 includes decrypting the double layer for the selected tracks, which first requires symmetric followed by asymmetric decrypting. Step 1004 includes identifying the flag signals on each of the selector tracks by two sub-steps. Sub-step 1004a includes identifying the flag signals when these have been used by the devices associated with the meeting. Sub-step 1004b includes identifying landmarks or templates in the form of pseudo-flag signals within the tracks when it was not possible to use the flag signals generated by the method. Step 1005 includes synchronizing the audio-video tracks using the previously identified flag or pseudo-flag signals. Step 1006 includes filtering the audio-video tracks to eliminate noise. Step 1007 includes selecting the optimum sections per track. Step 1008 includes mixing the optimum sections obtained from each track to produce a single optimum audio-video track. Step 1009 includes encrypting the optimum audio track combining asymmetric and symmetric encryption (double layer). First, asymmetric encryption is performed using public/private key or fingerprint etc encryption. This is followed by symmetric encryption, selected from among the DES, AES, IDEA and RC5 etc algorithms. Step 1010 includes storing the final optimized and encrypted track in the database.

Figure 11:
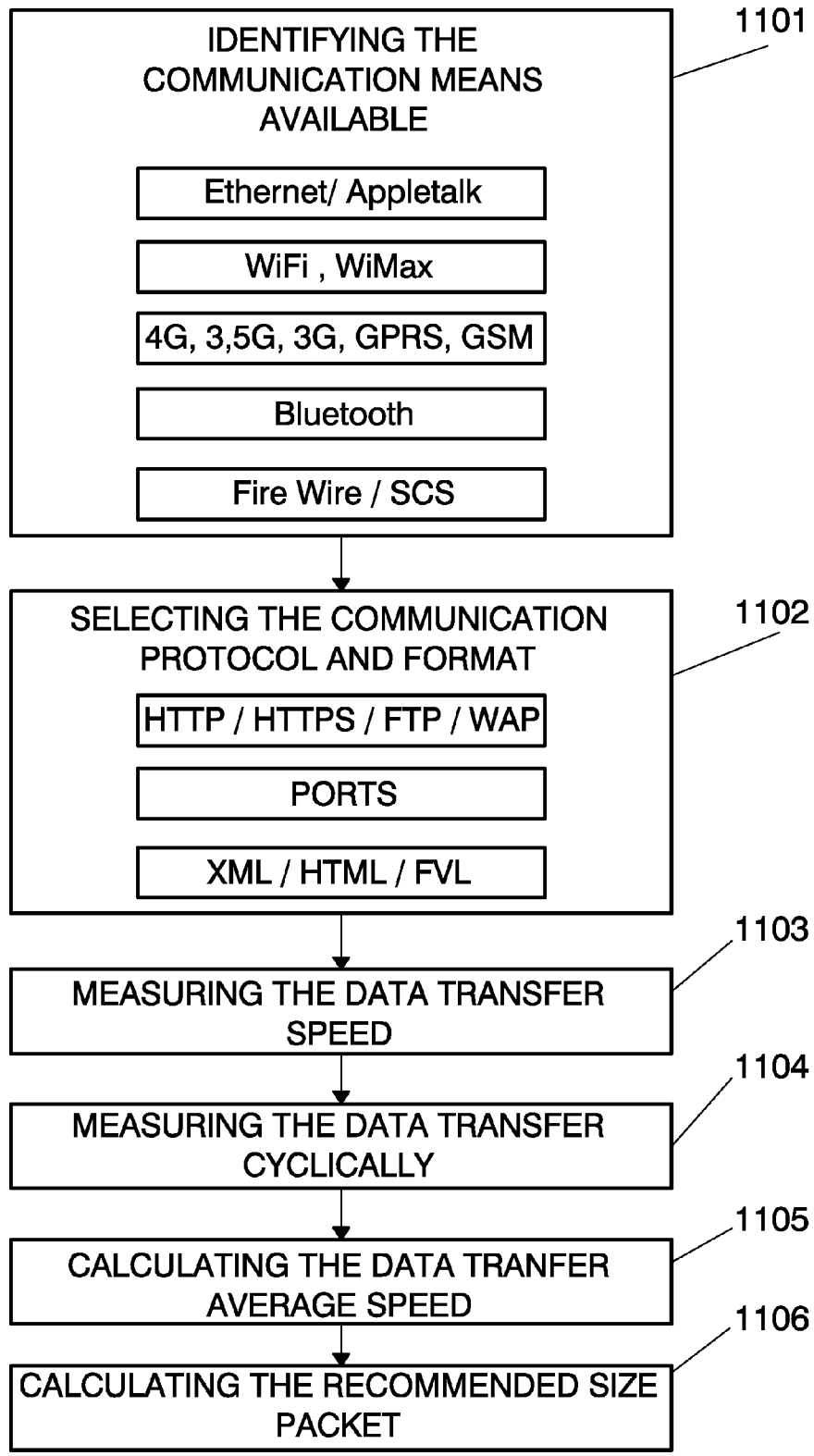
FIG. 11 shows the flow diagram for the communications between the electronic device and the meeting management method server in accordance with an embodiment of the invention.

FIG. 11 shows the flow diagram for the communications between the electronic device and the meeting recording, management and distribution method server in accordance with an embodiment of the invention. Step 1101 includes identifying the possible communications means in the electronic device for device-server communications, namely: Ethernet, AppleTalk, Wi-Fi, WiMax, 4G, 3.5G, 3G, GPRS, GSM, Bluetooth, FireWire, PSTN and SCSCI etc. Step 1102 includes identifying the possible communications means in the electronic device for device-server communications, among which the following are found: HTTP, HTTPS, FTP, WAP, PORTS, XML, HTML, FVL. Step 1103 includes measuring the transfer speed between the electronic device and the server by uploading test files to the server. Step 1104 includes periodic measurement of channel consistency. Step 1105 includes calculating the mean data transfer speed for the channel. Step 1106 includes calculating the recommended data packet size for device-server communications, i.e. the necessary data compression. The calculation of said recommended size is a function of the available device memory, the mean data transfer speed, compression speed, estimated duration and safety margin etc.

Figure 12:
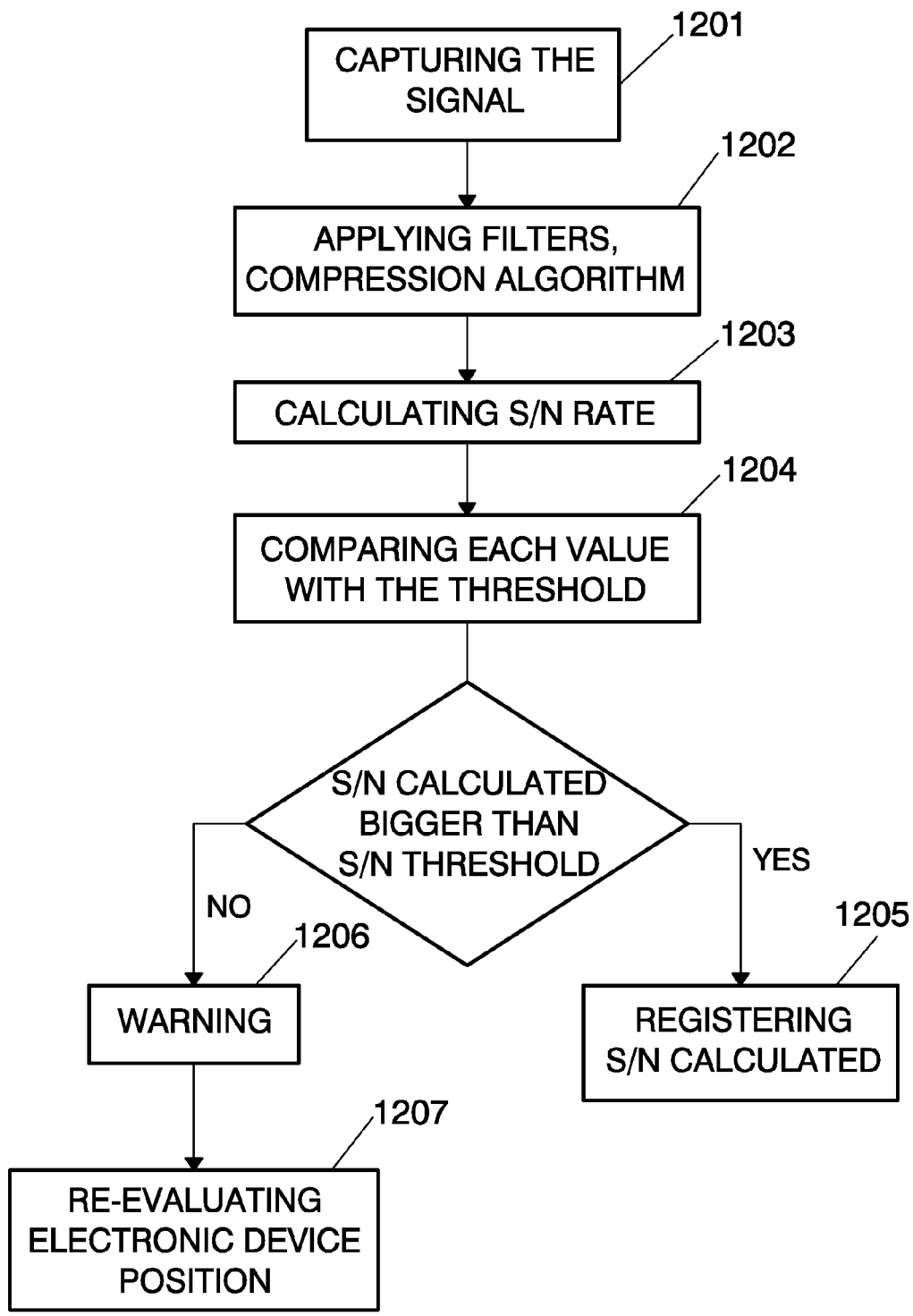
FIG. 12 shows the flow diagram for the automatic adjustment process adopted by the confidential meeting recording, management and distribution method in accordance with an embodiment of the invention defined in FIG. 2.

FIG. 12 shows the flow diagram for the automatic adjustment process adopted in step 205 in accordance with an embodiment of the invention defined in FIG. 2. Step 1201 includes periodically acquiring the signal via the device microphone and, optionally, via a camera or alternative audio-video signal acquisition means. Step 1202 includes applying the noise reduction filters and compression algorithms etc. Step 1203 includes calculating the signal to noise ratio. Step 1204 includes comparing the signal to noise ratio with a previously defined threshold value. If the obtained value exceeds the threshold, step 1205 includes recording said value on the server by coding and then transmitting it. If the value obtained in step 1204 does not exceed the predefined threshold, step 1206 includes notifying the electronic device user and recalculating the corresponding position, step 1207.

Figure 13:
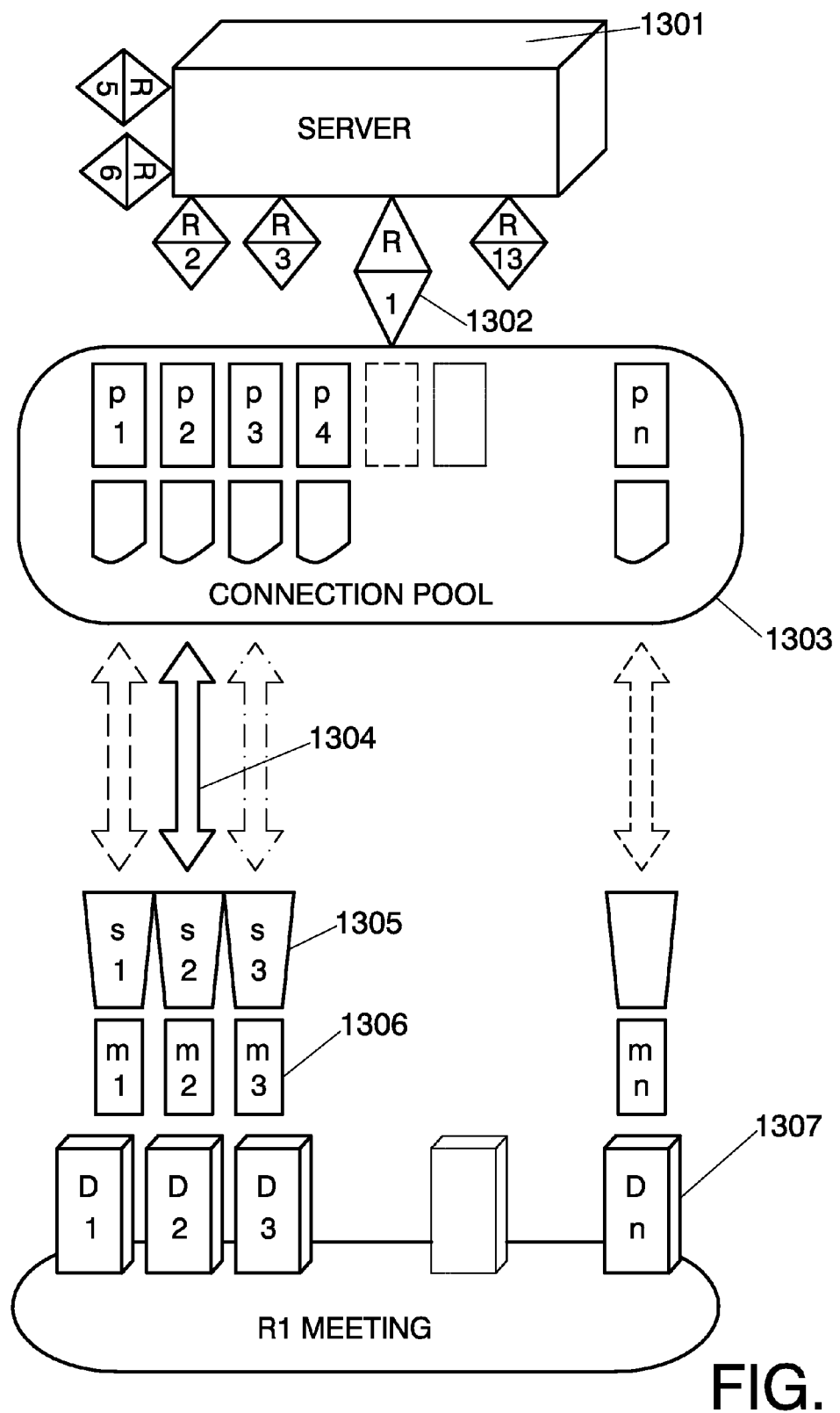
FIG. 13 shows the block diagram for device-server communications adopted by the confidential meeting recording, management and distribution method in accordance with an embodiment of the invention.

FIG. 13 shows the block diagram for device-server communications adopted by the confidential meeting recording, management and distribution method by multiple electronic devices in accordance with an embodiment of the invention. Server 1301 comprises one communications module per meeting 1302. Similarly, the sever has a connections pool 1303 for each active meeting that enables one of the said pool connections for each active meeting, with said pool incorporating certain initial parameters: type and format etc. The communications channel 1304 enables the connection between the server 1301 and electronic device 1307 via a connection session 1305 and a connection mode 1306.

The invention claimed is:

1. A method for recording, management and confidential distribution of meetings by means of multiple electronic devices with remote server connection comprising the following steps: A) recording a meeting by means of at least one electronic device that comprises at least the following means: acquisition means for acquiring one element selected from the group consisting of audio and audio/video; signal transmission means; signal processing means for processing one element selected from the group consisting of audio and audio/video; storage means; and, data exchange means with at least one external electronic device; B) sending audio tracks to a remote server; C) synchronizing the audio tracks on the server by detecting flag signals included during meeting recording and inserted by the signal processing means; D)

selecting optimum audio segments per audio track from among all the tracks received by the server, from the electronic devices associated with the same meeting; E) mixing the optimum segments per track in order to obtain a final optimum audio track; F) storing a final encrypted and encoded optimum track in a database; G) publishing the final optimum audio track in confidential mode, with authorization; wherein step A) comprises the following steps in the at least one electronic device: a) activating a method in the electronic device via a user password; b) executing an electronic device test; c) checking for a connection with an available server; d) performing a room test; e) calibrating a meeting room, a main electronic device and at least one secondary electronic device; f) calibrating a flag signal; g) executing participant and meeting location identification processes; h) registering electronic device technical characteristics; i) initiating meeting recording; j) initiating at least one parallel process; k) finishing the meeting recording; and, 1) sending the data containing the meeting recording to the server; and wherein step F) comprises transmitting a ciphered flag signal, which contains at least one of the following: signal type; retransmission periodicity; signal volume; coding type; identification type; periodicity type; said ciphered flag signal is transmitted by the main device and received by at least one slave electronic device, wherein the one slave electronic device stores the ciphered flag signal for subsequent synchronization, by the server, of the meeting recordings in the main device and at least one slave electronic device.

2. The method of claim 1, wherein the audio tracks further comprise video.

3. The method of claim 1, wherein step b) comprises evaluating the following device hardware resources: CPU, RAM, CPU clock speed, available hard disk space, recording speed, encryption test computation speed; microphone: frequency, gain, number of inputs; type, directional, environment, stereo; loudspeakers: maximum volume, distortion and power; video: resolution, focus, white balance, refresh speed; communications network connection: physical communications type: telephone line, modem, Ethernet, USB, wireless, GRPS, 3G; communications protocol: FTP, HTTP, WAP, port connection test with the server, average upload and download speeds with the remote server, environment: local network, Intranet, Internet, direct connection; additional characteristics: GPS, finger print reader, USB connection, hands-free loudspeakers, environmental microphone, infrared sensor and Bluetooth; further, step b) comprises evaluating whether the electronic device meets minimum requirements for performing the functions of recording, notifying the user with a recording type of meeting and a maximum estimated recording time with and without server communications.

4. The method of claim 1, wherein step d) additionally comprises performing the following steps: showing through drawings predefined optimum positions; indicating on a room drawing, approximate positions where the devices should be located, together with the participants that are going to register; describing, the meeting location, via a Web or local interface in the device, together with a wizard, said wizard includes parameters for introducing the user, as well as the description of the environment, noise, sound sources, background music, together with physical room aspects: size, shape, height, table, table shape and position; and, evaluating participant voice recordings.

5. The method of claim 1, wherein step e) comprises carrying out the following steps: emitting an audio signal varying the intensity and tone of said audio signal via a electronic device; measuring the intensity of the audio signal received by other electronic devices; processing and comparing the received signal with standards stored in the memories on the rest electronic devices; determining the quality of the received audio signal and sending said received audio signal to the server; receiving and processing information from the server as follows: a position; electronic device type: main or secondary; evaluating new conditions: ambient noise variations and changes in participants positions, sending the information to the server; re-evaluating attendee voice recording, in which one of the electronic devices requests the participants to, one-by-one, say a few predetermined words in order to measure the power and reception quality of said attendee voice recording, sending the information to the server; further processing and recommending actions from the server: moving one or more electronic devices in order to guarantee correct recording.

6. The method of claim 1, wherein step g) further comprises the following steps: determining participant biometric parameters: voice and fingerprint; determining meeting location via: GPS, mobile phone network cell, phone signal triangulation, originating phone and network connection data.

7. The method of claim 1, wherein step j) further comprises carrying out at least one of the following parallel processes: recording, comprising the following steps: recording; compressing; coding; and, transmission to server; controlling transmitted and received signal quality; controlling flag signal transmission via the main electronic device; initiating user action: calling a virtual secretary; calling voting; calling annotations; and; calling for labeling; initiating periodic checks: checking available space; checking connection and bandwidth; and, checking noise.

8. The method of claim 1, wherein said method further comprises the following steps in the flag signal transmitting device: receiving parameters from the server to the main electronic device over the connection with the server; controlling a sequence; encoding the flag signal; controlling parameters that determine the flag signal type; controlling a periodicity with which the flag signal is transmitted; transmitting the flag signal; re-evaluating the flag signal parameters; detecting parameter changes; and, sending the detected changes to the server.

9. The method of claim 1, wherein said method further comprises the following automatic adjustment process on each device associated with the meeting: acquiring the audio signal via the device acquisition means, periodically; applying noise reduction filters and compression algorithms; calculating the signal to noise rate, "S/N rate"; comparing each previously calculated value with a predefined threshold value; registering the obtained value on the server by encoding and then transmitting the obtained value when the obtained value exceeds the threshold; and, notifying the electronic device user and recalculating a position of the electronic device user when the obtained value does not exceed the predefined threshold.

10. The method of claim 1, wherein said method comprises the following steps on the server: registering the electronic devices; validating user passwords; registering the meeting; receiving results information on a device test; receiving results information on a room test; sending flag signal parameters to the electronic devices; checking a connection; sending electronic device positions and determine the main and at least secondary devices; sending confirmation of meeting start; including additional meeting data; processing parallel processes; processing virtual secretary petition; processing voting petition; processing automatic and manual process petitions; and, downloading software.

11. The method of claim 10, wherein said method further comprises the following steps on the server: receiving meeting concluded confirmation from at least one device; receiving online files that contain all information associated with the meeting; debugging and mixing of the various files associated with each device in order to obtain a final audio and video track by means of the following sub-steps decrypting the audio and video tracks, checking initial parameters, decoding by means of a symmetric algorithm; identifying the flags on each track selected by two sub-steps: identifying the flag signals when they have been used by the devices associated with the meeting; identifying landmarks in the form of pseudo-flag signals within the tracks when it was not possible to use the flag signals generated by the method; synchronizing the audio-video tracks using the previously identified flag signals; filtering the audio-video tracks to eliminate noise; selecting optimum segments per track; mixing the optimum sections obtained from each track to produce a single optimum audio track; encrypting the optimum audio track combining asymmetric and symmetric encryption: carrying out symmetric encryption, by means of one algorithm selected from the group consisting of DES algorithms and AES algorithm; carrying out asymmetric encryption selected from the group consisting of asymmetric public key, password and fingerprint encryption by conversion to a code-key of the already symmetrically ciphered information; storing the final optimized and encrypted track in the database; carrying out automatic and manual processes; the method further comprises repeating the previous steps as many times as the number of times that the files arrive at the server when communications are offline.

12. The method of claim 10, wherein said method further comprises the following steps on the server: receiving a user petition selected from the group consisting of access and consultation; denying access to an unauthorized user and allowing access to all meeting data to an authorized user; activating a User Manager to handle user access to the stored information in function of the type of access said users have to the information; performing a search of the database that holds all user characteristics, together with distribution lists; presenting results required by the authorized user by means of a Publication Manager.

13. The method of claim 10, wherein said method further comprises the following steps on the server: identifying possible communications means in the electronic device for device-server communications; selecting a format and communication protocol according to an available physical mean in the electronic device; measuring the transfer speed between the electronic device and the server by uploading test files to the server; measuring channel consistency; calculating mean data transfer speed for the channel; calculating a recommended data packet size for device-server communications with said calculation of recommended size being a function of the available device memory, the mean data transfer speed, compression speed, estimated duration and safety margin.

14. A computer program product comprising a non-transitory computer usable medium having computer readable program code means embodied in said medium for causing an application program to execute on a computer, said computer means readable by program code, comprising: first computer readable program code means for recording a meeting; second computer readable program code means for transmitting audio tracks to a remote server; third computer readable program code means for detecting flag signals; fourth computer readable program code means for synchronizing audio-video tracks using the previously detected flag signals; fifth computer readable program code means for selecting optimum audio-video segments per track; sixth computer readable program code means for mixing the optimum audio-video tracks into a final optimized track; seventh computer readable program code means for storing the final optimized track in a database; eighth computer readable program code means for initiating meeting recording; and ninth computer readable program code means for confidential publication of the final optimized track; the first computer readable program code means for recording a meeting further comprising code to carry out the following steps in the at least one electronic device: a) activating a method in the electronic device via a user password; b) executing an electronic device test; c) checking for a connection with an available server; d) performing a room test; e) calibrating a meeting room, a main electronic device and at least one secondary electronic device; f) calibrating a flag signal; g) executing participant and meeting location identification processes; h) registering electronic device technical characteristics; i) initiating meeting recording; j) initiating at least one parallel process; k) finishing the meeting recording; and, l) sending the data containing the meeting recording to the server; and the seventh computer readable program code means for storing the final optimized track in a database further comprises code for transmitting a ciphered flag signal, which contains at least one of the following: signal type; retransmission periodicity; signal volume; coding type; identification type; periodicity type; said ciphered flag signal is transmitted by the main device and received by at least one slave electronic device, wherein the one slave electronic device stores the ciphered flag signal for subsequent synchronization, by the server, of the meeting recordings in the main device and at least one slave electronic device.

* * * * *